US011309948B1

United States Patent
Chen et al.

(10) Patent No.: US 11,309,948 B1
(45) Date of Patent: Apr. 19, 2022

(54) DETECTING A PRESENCE OF A PERSON USING A PREAMBLE AND AN ECHO ASSOCIATED WITH THE PREAMBLE

(71) Applicant: QUALCOMM Incorporated, San Diego, CA (US)

(72) Inventors: An Chen, San Diego, CA (US); Tom Chin, San Diego, CA (US); Ajit Chourasia, San Diego, CA (US); Ajith Tom Payyappilly, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,155

(22) Filed: Jun. 15, 2021

(51) Int. Cl.
*H04B 7/06* (2006.01)
*H04L 5/00* (2006.01)
*H04W 88/04* (2009.01)
*H04W 72/04* (2009.01)
*H04B 7/08* (2006.01)

(52) U.S. Cl.
CPC .......... *H04B 7/0617* (2013.01); *H04B 7/0811* (2013.01); *H04L 5/0048* (2013.01); *H04W 72/046* (2013.01); *H04W 88/04* (2013.01)

(58) Field of Classification Search
CPC ..... H04W 4/70; H04W 72/046; H04W 88/04; H04L 25/0212; H04L 5/0048; H04J 3/1682; H04B 7/0617; H04B 7/0811
See application file for complete search history.

(56) References Cited

U.S. PATENT DOCUMENTS

2021/0392650 A1* 12/2021 Abedini .................. H04L 5/16

* cited by examiner

*Primary Examiner* — Sung S Ahn
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit a preamble in a direction using beamforming. The UE may receive an echo based at least in part on the preamble transmitted in the direction. The UE may detect a presence of a person based at least in part on a power level associated with the echo satisfying a threshold. Numerous other aspects are described.

30 Claims, 13 Drawing Sheets

DETECTING A PRESENCE OF A PERSON USING A PREAMBLE AND AN ECHO ASSOCIATED WITH THE PREAMBLE

FIELD OF THE DISCLOSURE

Aspects of the present disclosure generally relate to wireless communication and to techniques and apparatuses for detecting a presence of a person using a preamble and an echo associated with the preamble.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a user equipment (UE) includes a memory and one or more processors, coupled to the memory, configured to: transmit a preamble in a direction using beamforming; receive an echo based at least in part on the preamble transmitted in the direction; and detect a presence of a person based at least in part on a power level associated with the echo satisfying a threshold.

In some aspects, a method of wireless communication performed by a UE includes transmitting a preamble in a direction using beamforming; receiving an echo based at least in part on the preamble transmitted in the direction; and detecting a presence of a person based at least in part on a power level associated with the echo satisfying a threshold.

In some aspects, a non-transitory computer-readable medium storing a set of instructions for wireless communication includes one or more instructions that, when executed by one or more processors of a UE, cause the UE to: transmit a preamble in a direction using beamforming; receive an echo based at least in part on the preamble transmitted in the direction; and detect a presence of a person based at least in part on a power level associated with the echo satisfying a threshold.

In some aspects, an apparatus for wireless communication includes means for transmitting a preamble in a direction using beamforming; means for receiving an echo based at least in part on the preamble transmitted in the direction; and means for detecting a presence of a person based at least in part on a power level associated with the echo satisfying a threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
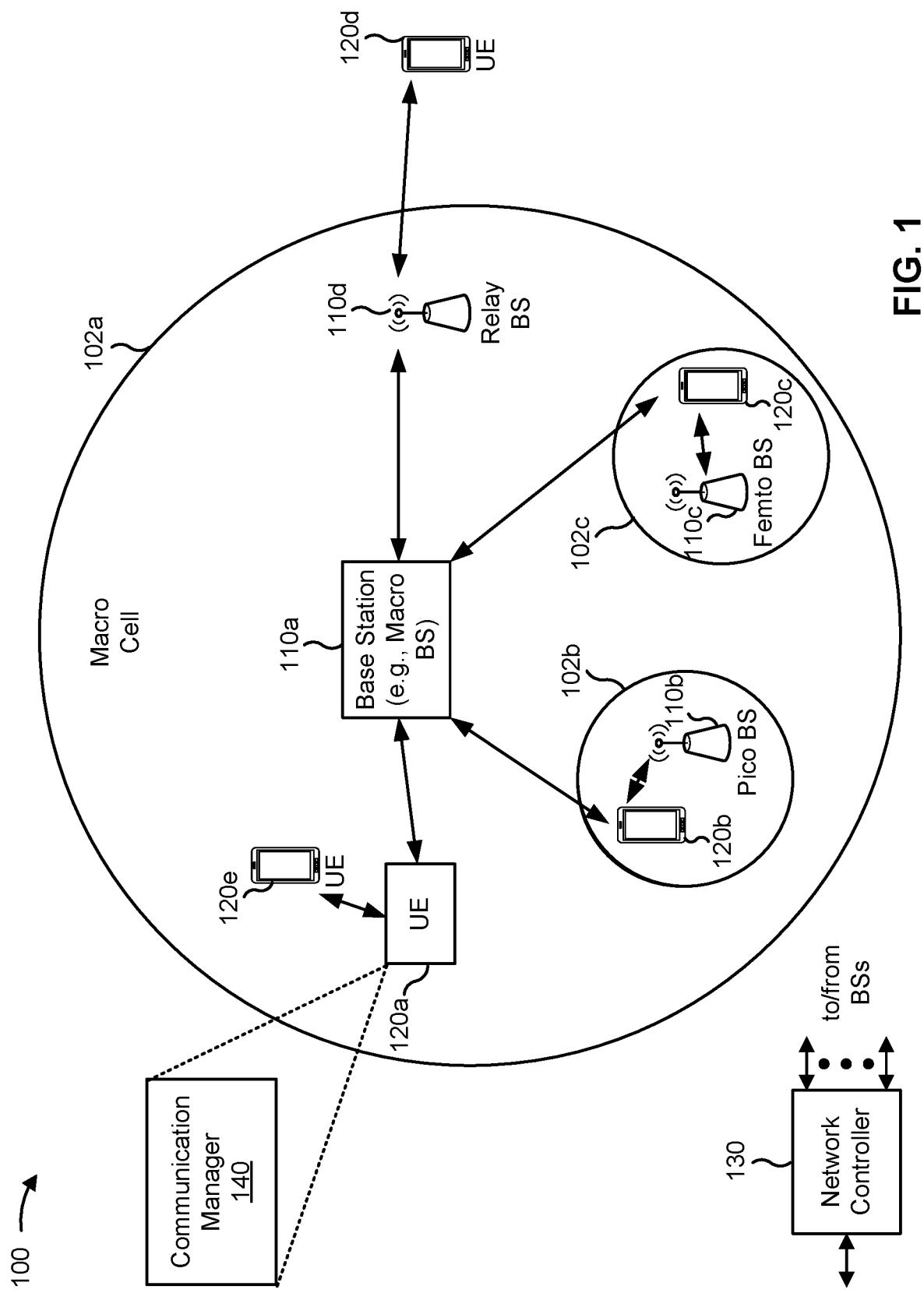
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit a preamble in a direction using beamforming; receive an echo based at least in part on the preamble transmitted in the direction; and detect a presence of a person based at least in part on a power level associated with the echo satisfying a threshold. Additionally, or alternatively, the communication manager 140 may perform one or more other operations described herein.

As indicated above, FIG. 1 is provided as an example. Other examples may differ from what is described with regard to FIG. 1.

Figure 2:
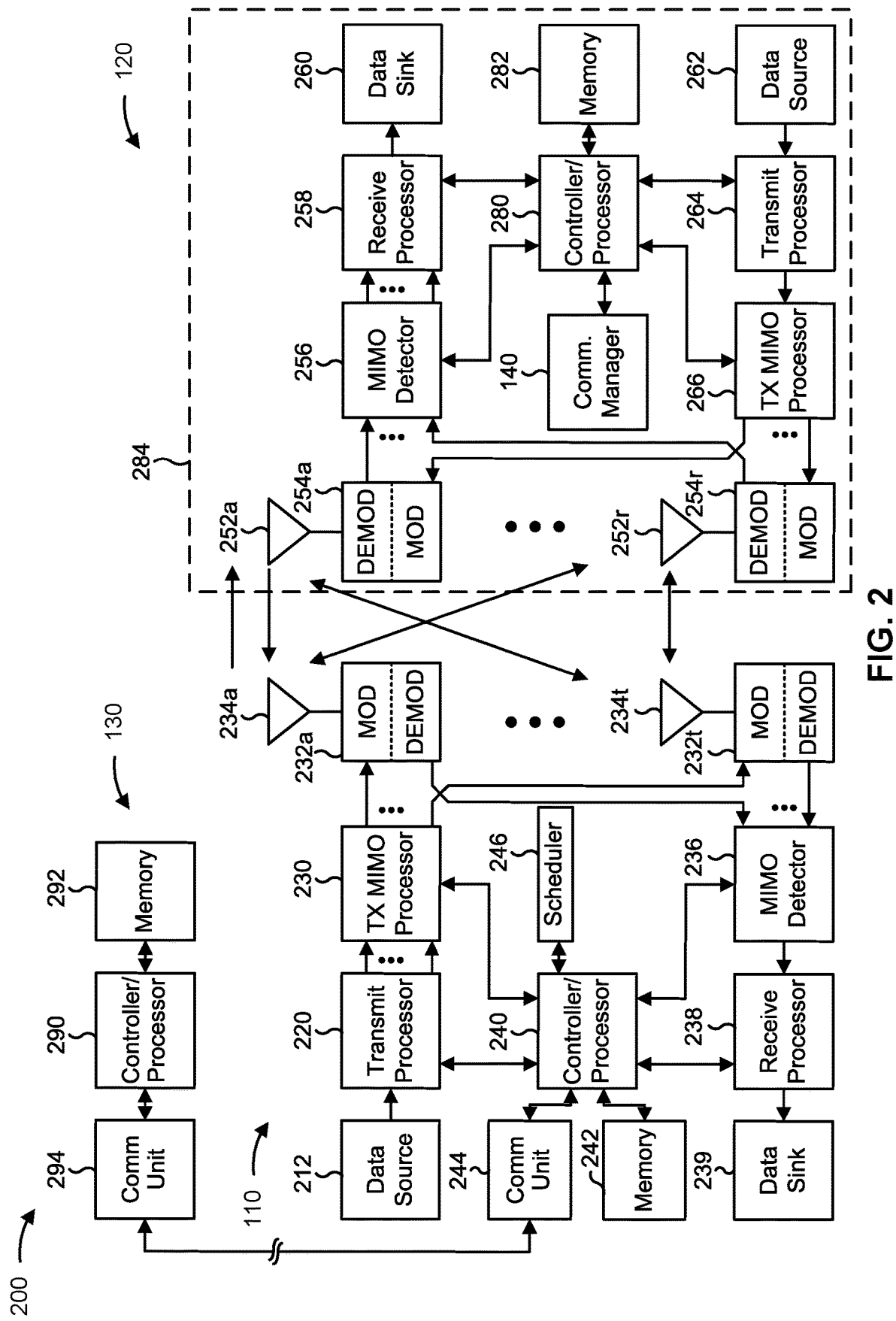
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the base station 110, the controller/processor 280 of the UE 120, and/or any other component(s) of FIG. 2 may perform one or more techniques associated with detecting a presence of a person using a preamble and an echo associated with the preamble, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting a preamble in a direction using beamforming; means for receiving an echo based at least in part on the preamble transmitted in the direction; and/or means for detecting a presence of a person based at least in part on a power level associated with the echo satisfying a threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A presence of a person in a self-driving vehicle may be detected for various reasons. The person may be a driver of the self-driving vehicle and/or a passenger of the self-driving vehicle. For example, depending on whether the person is detected in the self-driving vehicle, a self-driving mode may be enabled. The self-driving mode may be enabled when the person is detected in the self-driving vehicle, or alternatively, the self-driving mode may be not enabled when the person is not detected in the self-driving vehicle. The detection of the person in the self-driving vehicle may be applicable when self-driving is enabled by a remote command. As another example, depending on the person detected in the self-driving vehicle, various actions may be performed, such as adjusting a temperature in the self-driving vehicle or adjusting an audio system in the self-driving vehicle.

In some cases, various sensors may be used to detect the presence of the person in the self-driving vehicle. For example, motion sensors and/or weight-based sensors within vehicle seats may be used to determine whether the person is present in the self-driving vehicle. However, these sensors may suffer from false positives (e.g., when an object is placed on a vehicle seat and the self-driving vehicle mistakenly determines that a person is sitting on the vehicle seat). Further, these sensors do not utilize a functionality of a UE, such as a cellular modem, associated with the self-driving vehicle for detecting the presence of the person in the self-driving vehicle. The UE may communicate with a base station to enable self-driving, but the UE may be capable of other functionalities that could aid the detection of the presence of the person in the self-driving vehicle.

In various aspects of techniques and apparatuses described herein, a UE (e.g., a cellular modem in a self-driving vehicle or in a building) may transmit a preamble in a direction using beamforming. The preamble may include multiple preambles, which may be transmitted in multiple directions using multiple sweeping beams. The UE may transmit the preamble using a millimeter wave frequency. The UE may receive an echo based at least in part on the preamble transmitted in the direction. The UE may detect a presence of a person based at least in part on a power level associated with the echo satisfying a threshold. For example, the UE may detect the presence of the person when a difference between the power level associated with the echo and a background power level satisfies the threshold. In some aspects, the UE may provide a command based at least in part on detecting the presence of the person. The command may instruct an external system to perform an action, such as adjust a temperature, adjust a lighting, and/or adjust a sound level based at least in part on the presence of the person. As a result, the UE may be used to detect the presence of the person, and perform the action based at least in part on the presence of the person.

Figure 3:
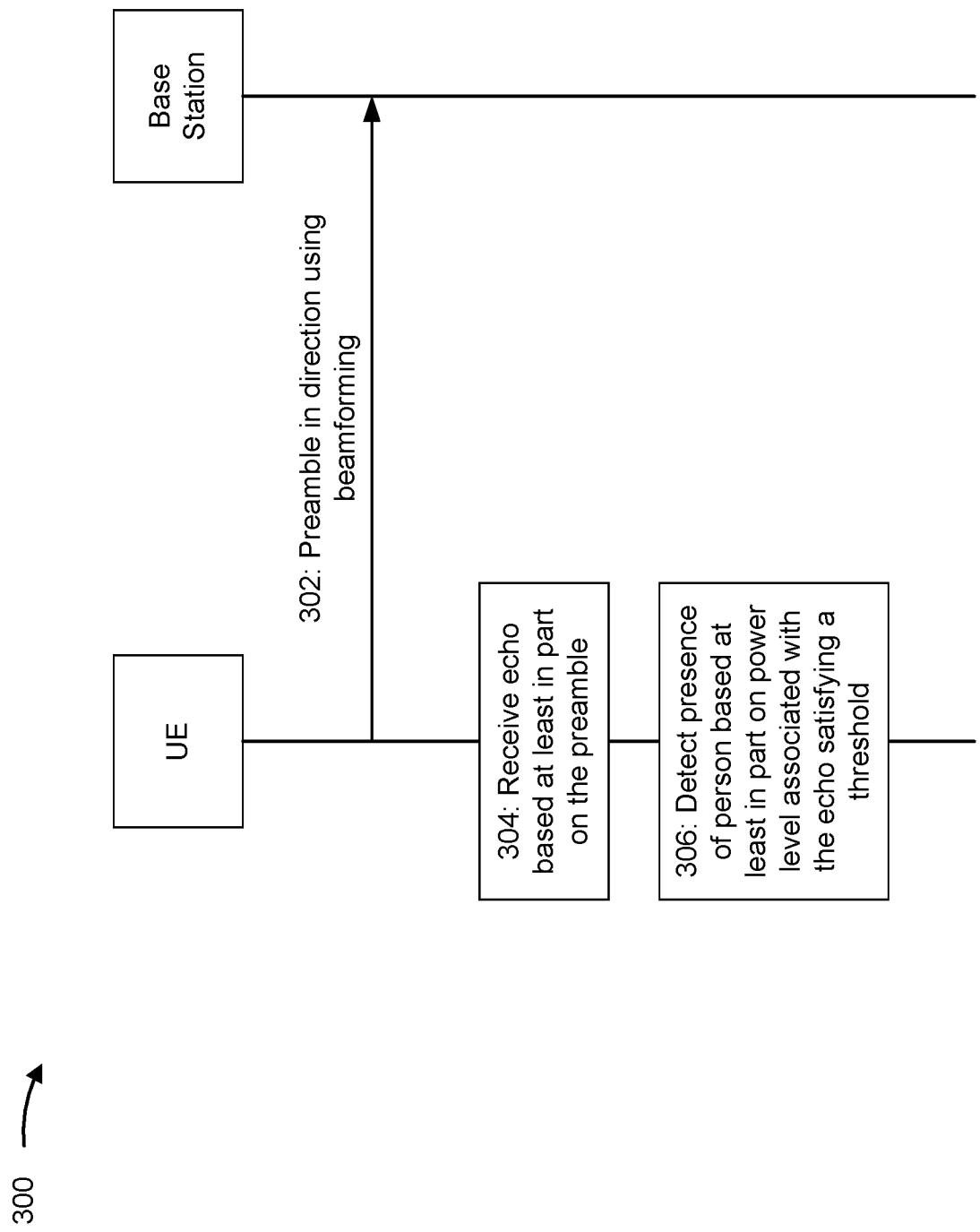
FIG. 3 is a diagram illustrating an example associated with detecting a presence of a person using a preamble and an echo associated with the preamble, in accordance with the present disclosure.

FIG. 3 is a diagram illustrating an example 300 associated with detecting a presence of a person using a preamble and an echo associated with the preamble, in accordance with the present disclosure. As shown in FIG. 3, example 300 includes communication between a UE (e.g., UE 120) and a base station (e.g., base station 110). In some aspects, the UE and the base station may be included in a wireless network, such as wireless network 100.

In some aspects, the UE may be a cellular modem associated with a self-driving vehicle. In some aspects, the UE may be a cellular modem associated with a building.

As shown by reference number 302, the UE may transmit a preamble in a direction using beamforming. The direction may include a driver seat direction or a passenger seat direction. The preamble may be a random access channel (RACH) preamble. The preamble may correspond to a millimeter wave transmission. The UE may transmit the preamble to the base station. However, a power level associated with the preamble may purposely not satisfy a threshold, and the preamble may not be received at the base station. The power level associated with the preamble may not satisfy the threshold in order to not cause interference with the base station. The power level associated with the preamble may be less than a power level associated with a typical RACH preamble.

In some aspects, the preamble may include multiple preambles. The UE may transmit the multiple preambles in multiple directions using multiple sweeping beams. In some aspects, the preamble may not correspond with a preamble sequence configured for an NR cell that includes the UE, where the NR cell may be associated with the base station. In some aspects, the UE may transmit the preamble using an absolute radio-frequency channel number (ARFCN) frequency with an RSRP or an RSSI that satisfies a threshold to reduce interference with existing NR cells.

In some aspects, the UE may transmit the preamble based at least in part on a time division duplexing (TDD) downlink-uplink pattern of a serving cell and/or a neighboring cell to reduce a likelihood of collisions. In some aspects, the UE may transmit the preamble based at least in part on a coordination with other UEs to reduce the likelihood of collisions. In some aspects, the UE may transmit the preamble over a sidelink interface to reduce the likelihood of collisions.

As shown by reference number 304, the UE may receive an echo based at least in part on the preamble transmitted in the direction. In other words, the UE may detect the echo, where the echo may be a result of the UE transmitting the preamble in the direction using beamforming. The echo may be associated with a reflection of the preamble, where the preamble may correspond to the millimeter wave transmission.

As shown by reference number 306, the UE may detect a presence of a person based at least in part on a power level associated with the echo satisfying a threshold. The person may be present in the self-driving vehicle or in the building. The UE may detect the presence of the person when a difference between the power level associated with the echo and a background power level satisfies the threshold. In some aspects, when the preamble includes the multiple preambles, the UE may detect the presence of the person based at least in part on a subset of the multiple preambles being associated with echoes having power levels that satisfy the threshold.

In some aspects, when the UE detects the presence of the person, the person may be in proximity to the UE. The UE and the person may be in proximity to each other when the UE and the person are both associated with a same self-driving vehicle, when the UE and the person are both within a same building or within a same room in the building, and so on.

In some aspects, the UE may provide a command based at least in part on detecting the presence of the person. The UE may provide the command to an external system. The command may instruct the external system to perform an action when the presence of the person is detected. The action may involve adjusting a temperature, adjusting a lighting, and/or adjusting a sound level based at least in part on the presence of the person.

In some aspects, the UE may detect the presence of the person based at least in part on the power level associated with the echo satisfying the threshold and by using information received from one or more sensor systems. The one or more sensor systems may include sensors installed in various areas of the self-driving vehicle or the building and may include motion sensors, weight sensors, or other types of sensors. The UE may use the information received from the one or more sensor systems along with the power level associated with the echo satisfying the threshold to determine that the person is present in the self-driving vehicle or in the building.

In some aspects, the UE may transmit one or more preambles associated with increasing power levels. The UE may transmit the one or more preambles without a random backoff, which may reduce a delay between each preamble transmission. The UE may stop transmitting the one or more preambles based at least in part on the power level associated with the echo satisfying the threshold. In some aspects, the UE may transmit the preamble at a power level that corresponds to a last successful power level for receiving a last echo. In other words, the UE may transmit the preamble at the power level at which the UE previously received the last echo. The power level for the preamble may be associated with a location and/or a vehicle orientation. In other words, based at least in part on a particular location and/or a vehicle orientation, the UE may transmit the preamble with a certain power level.

In some aspects, the UE may receive, from the base station, one or more synchronization signal blocks (SSBs). The UE may determine a weakest network radiated beam direction among a plurality of beam directions based at least in part on the one or more SSBs. The weakest network radiated beam direction may be associated with a power level that is less than other beam directions in the plurality of beam directions. The UE may transmit the preamble using the weakest network radiated beam direction. As a result, the UE may minimize a likelihood of causing network interference.

As indicated above, FIG. 3 is provided as an example. Other examples may differ from what is described with regard to FIG. 3.

Figure 4:
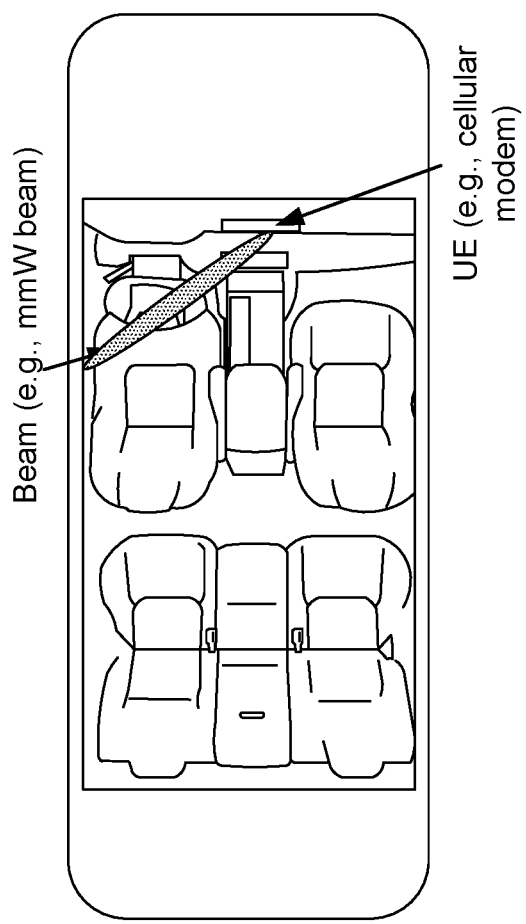
FIGS. 4-6 are diagrams illustrating examples associated with detecting a presence of a person in a self-driving vehicle, in accordance with the present disclosure.

FIG. 4 is a diagram illustrating an example 400 associated with detecting a presence of a person in a self-driving vehicle, in accordance with the present disclosure.

In some aspects, a self-driving vehicle may include a UE (e.g., UE 120), such as a cellular modem. The cellular modem may be an NR modem or a 5G modem. In some cases, the UE may be non-stationary. For example, the UE may be integrated with the self-driving vehicle. In other cases, the UE may be a stationary device located within the self-driving vehicle.

In some aspects, the UE may perform transmissions, such as millimeter wave transmissions, using beamforming to detect a presence of a person in the self-driving vehicle. In this example, the person may be a driver of the self-driving vehicle. In some aspects, the UE may transmit a preamble with a beam direction that points toward a driver seat direction. The UE may transmit the preamble and detect a power level of an echo associated with the transmission of the preamble. When the echo is detected, the UE may determine that the driver is present in the self-driving vehicle. In some aspects, the UE may determine that the driver is present in the self-driving vehicle based at least in part on R1−R0>TH, where R1 represents a power level of the echo, R0 represents a power level of an echo from a vehicle background, and TH represents a threshold value. Further, R0 may be a preconfigured value which may be determined at a factory.

As indicated above, FIG. 4 is provided as an example. Other examples may differ from what is described with regard to FIG. 4.

Figure 5:
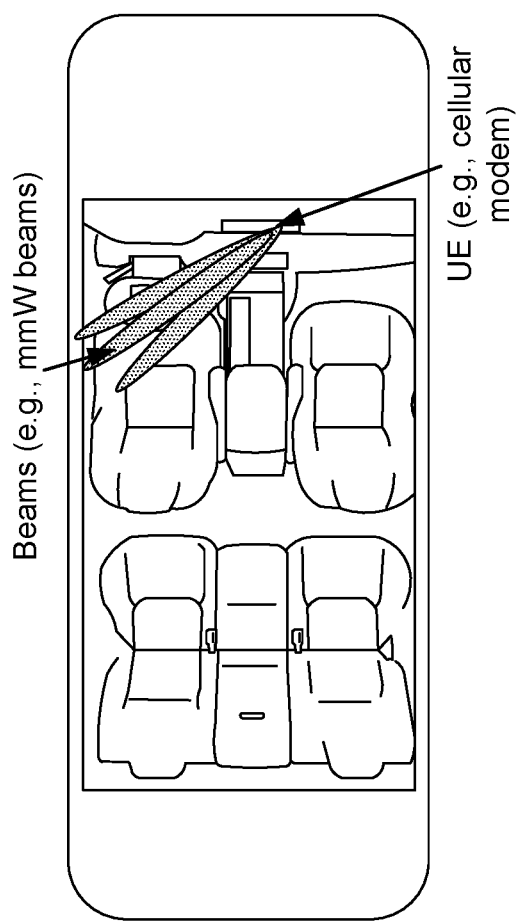

FIG. 5 is a diagram illustrating an example 500 associated with detecting a presence of a person in a self-driving vehicle, in accordance with the present disclosure.

In some aspects, a UE (e.g., UE 120), such as a cellular modem in a self-driving vehicle, may perform multiple transmissions using beamforming to detect a presence of a person in the self-driving vehicle. In this example, the person may be a driver of the self-driving vehicle. In some aspects, the UE may transmit multiple preambles with beam directions that point toward a driver seat direction. The UE may transmit the multiple preambles and detect power levels of echoes associated with the transmission of the multiple preambles. When the echoes are detected, the UE may determine that the driver is present in the self-driving vehicle.

In some aspects, the UE may determine that the driver is present in the self-driving vehicle when at least K out of N beams transmitted have echoes that are different from a vehicle background echo by more than a threshold. The UE may determine that the driver is present in the self-driving vehicle based at least in part on Cardinality {j: R1(j)−R0(j)>TH(j), j=1, . . . , N}≥K, where R1(j) represents a power level of echo caused by beam j and R0(j) represents a power level of echo from the vehicle background caused by beam j. Further, R0(j) may be a preconfigured value which may be determined at a factory.

As indicated above, FIG. 5 is provided as an example. Other examples may differ from what is described with regard to FIG. 5.

Figure 6:
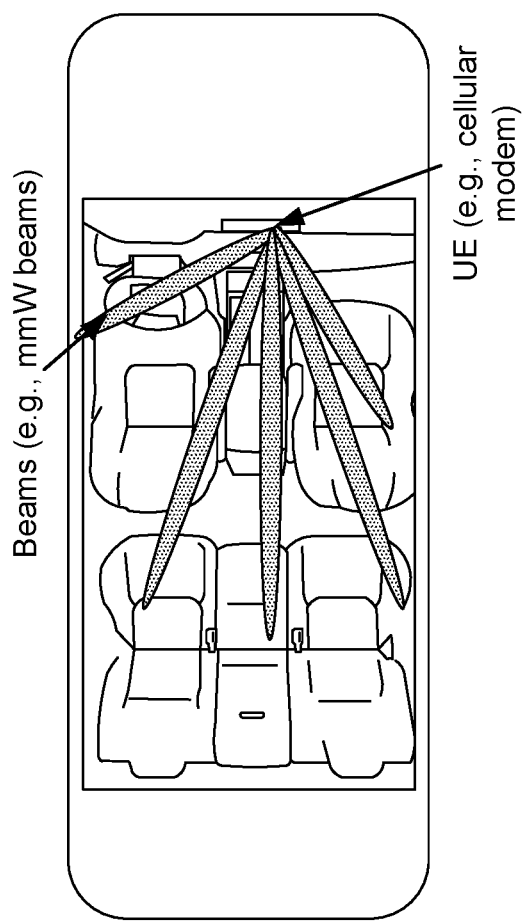

FIG. 6 is a diagram illustrating an example 600 associated with detecting a presence of a person in a self-driving vehicle, in accordance with the present disclosure.

In some aspects, a UE (e.g., UE 120), such as a cellular modem in a self-driving vehicle, may perform beam sweeping to detect a presence of one or more persons in the self-driving vehicle. The one or more persons may include a driver and/or one or more passengers of the self-driving vehicle. The UE may use multiple sweeping beams to detect the presence of the one or more persons in the self-driving vehicle. In some aspects, the UE may transmit multiple preambles with different beam directions that point toward multiple seat directions. The UE may transmit the multiple preambles and detect power levels of echoes associated with the transmission of the multiple preambles. When the echoes are detected, the UE may determine that the one or more persons are present in the self-driving vehicle.

In some aspects, the UE may detect whether the one or more persons are present in the self-driving vehicle in order to enable various actions to be performed in the self-driving vehicle. For example, the UE may transmit an indication that indicates the presence of the one or more persons in the self-driving vehicle to a vehicle system. The vehicle system may adjust an air conditioning or a speaker system based at least in part on the indication. The vehicle system may adjust the air conditioning or the speaker system to tune to a location of a person in the self-driving vehicle. For example, the vehicle system may turn on or off heating or cooling in an area of the self-driving vehicle based at least in part on a presence (or a lack thereof) of a person in that area of the self-driving vehicle. As another example, the vehicle system may turn on or off a speaker in an area of the self-driving vehicle based at least in part on a presence (or a lack thereof) of a person in that area of the self-driving vehicle.

As indicated above, FIG. 6 is provided as an example. Other examples may differ from what is described with regard to FIG. 6.

Figure 7:
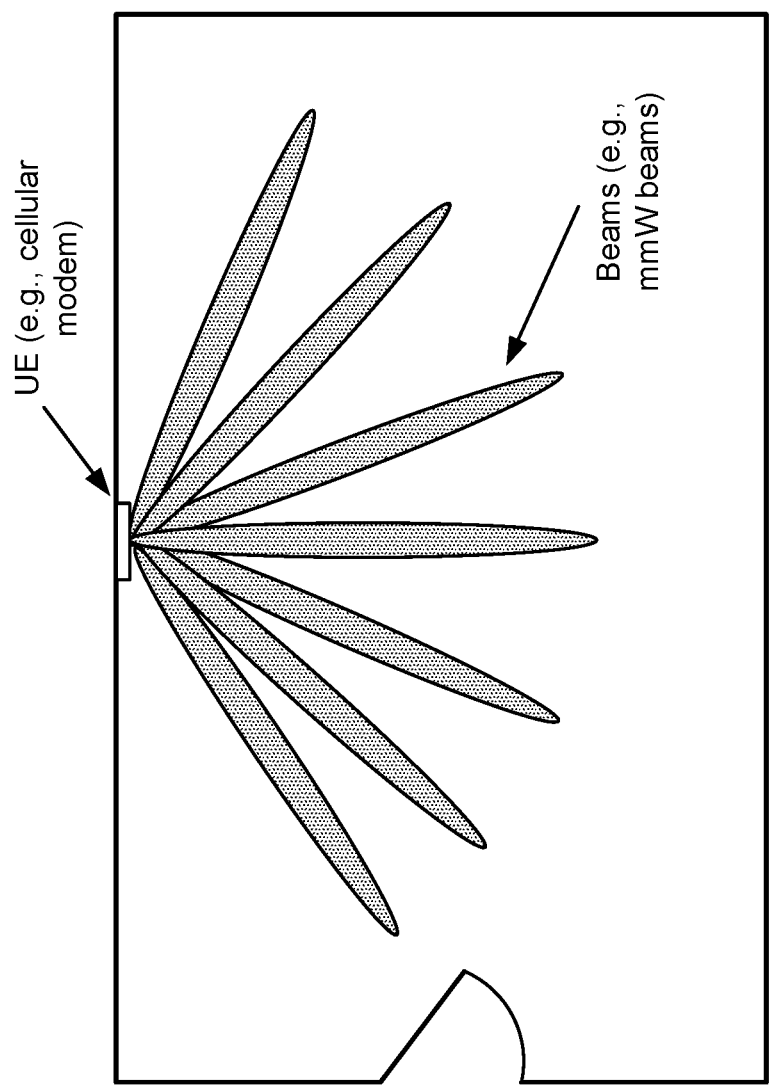
FIG. 7 is a diagram illustrating an example associated with detecting a presence of a person in a building, in accordance with the present disclosure.

FIG. 7 is a diagram illustrating an example 700 associated with detecting a presence of a person in a building, in accordance with the present disclosure.

In some aspects, a UE (e.g., UE 120), such as a cellular modem, may be located in a building, such as a home, an office building, a store, a theater, and so on. The UE may perform beam sweeping to detect a presence of one or more persons in the building. The UE may use multiple sweeping beams to detect the presence of the one or more persons in the building. In some aspects, the UE may transmit multiple preambles with different beam directions that point toward multiple directions. The UE may transmit the multiple preambles and detect power levels of echoes associated with the transmission of the multiple preambles. When the echoes are detected, the UE may determine that the one or more persons are present in the building.

In some aspects, the UE may detect the presence of the one or more persons as well as a relative location associated with the one or more persons within the building. In some aspects, the UE may obtain information associated with background echo levels when no persons are present in the building. The UE may compare a difference between detected echoes and the background echo levels with a threshold to determine whether one or more persons are present in the building.

In some aspects, the UE may detect whether the one or more persons are present in the building in order to enable various actions to be performed in the building. For example, the UE may transmit an indication that indicates the presence of the one or more persons in the building to a controller system associated with the building. The controller system may adjust an air conditioning, a lighting, and/or a sound level based at least in part on the indication. The controller system may adjust the air conditioning, the lighting, and/or the sound level to tune to a location of a person in the building.

As indicated above, FIG. 7 is provided as an example. Other examples may differ from what is described with regard to FIG. 7.

Figure 8:
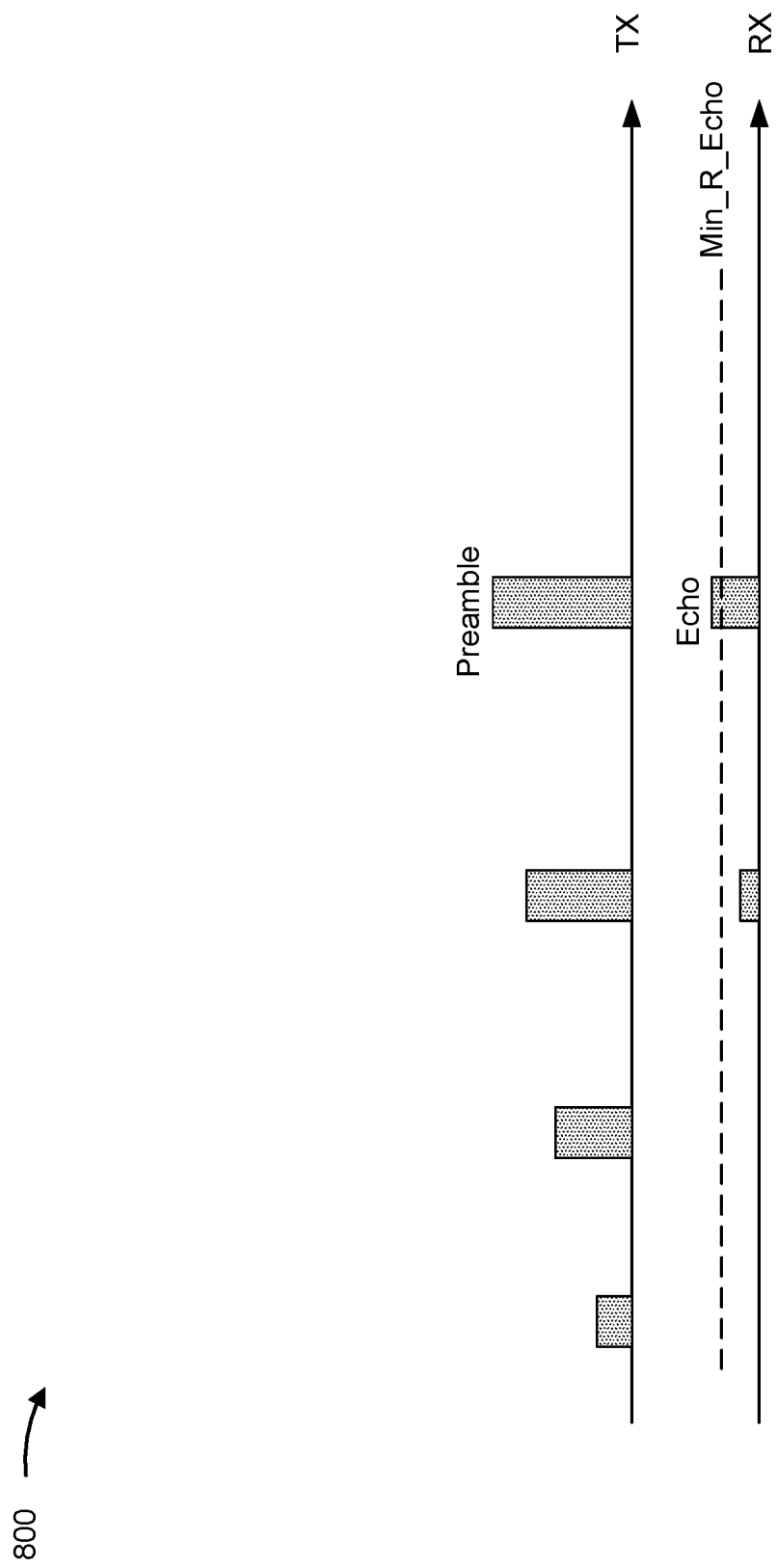
FIGS. 8-10 are diagrams illustrating examples associated with transmitting a preamble, in accordance with the present disclosure.

FIG. 8 is a diagram illustrating an example 800 associated with transmitting a preamble, in accordance with the present disclosure.

In some aspects, a UE (e.g., UE 120), such as a cellular modem, may transmit a preamble with a beam direction to detect a presence of a person. The preamble may be a RACH preamble. The UE may initially transmit a first preamble with a first power level. The UE may subsequently transmit additional preambles with incrementally increasing power levels. For example, the UE may transmit a second preamble with a second power level, where the second power level may be greater than the first power level. The UE may transmit a third preamble with a third power level, where the third power level may be greater than the second power level. In some aspects, the UE may continue transmitting preambles with increasing power levels until the UE detects an echo that satisfies a threshold (e.g., Min_R_Echo). For example, when the UE detects a sufficiently large echo signal (R) that is greater than the threshold, the UE may stop transmitting the preamble. In some aspects, a power level used to transmit each preamble may be less than a typical RACH signal power level to avoid interference with an NR network.

In the example shown in FIG. 8, the UE may transmit a first preamble with a first power level, but the UE may not detect an echo based at least in part on the first preamble. The UE may transmit a second preamble with a second power level, but the UE may not detect an echo based at least in part on the second preamble. The UE may transmit a third preamble with a third power level. The UE may detect an echo based at least in part on the third preamble, but a level of the echo may be less than the threshold. The UE may transmit a fourth preamble with a fourth power level. The UE may detect an echo based at least in part on the fourth preamble. In this case, a level of the echo may be greater than the threshold, so the UE may not transmit any additional preambles.

As indicated above, FIG. 8 is provided as an example. Other examples may differ from what is described with regard to FIG. 8.

In some aspects, to minimize interference with a nearby NR network, a UE may transmit a preamble based at least in part on an ARFCN frequency with an RSRP level and/or an RSSI level that satisfies a threshold. For example, when the RSRP level and/or the RSSI level is less than the threshold, the UE may reduce interference with existing NR cells. In some aspects, by selecting the ARFCN frequency with the RSRP level and/or the RSSI level that satisfies the threshold (e.g., a relatively small RSRP level and/or a relatively small RSSI level), the UE may be relatively far away from NR cells and may avoid interference with the NR cells. In some aspects, when the UE transmits the preamble using a millimeter wave frequency and nearby NR cells exist in relation to the UE, the UE may avoid using a preamble sequence configured by the nearby NR cells.

Figure 9:
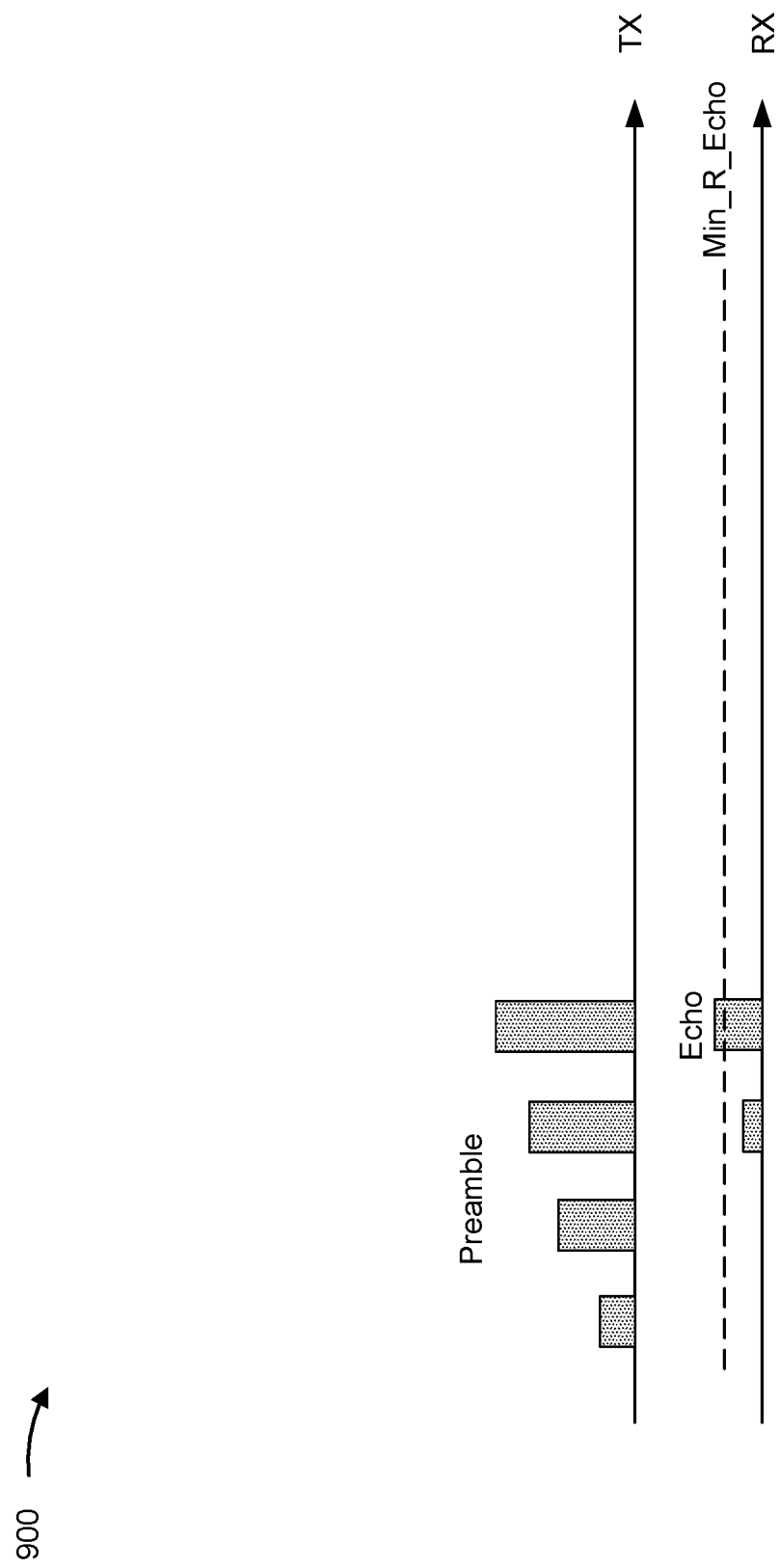

FIG. 9 is a diagram illustrating an example 900 associated with transmitting a preamble, in accordance with the present disclosure.

In some aspects, a UE (e.g., UE 120), such as a cellular modem, may transmit a preamble with a beam direction to detect a presence of a person. The preamble may be a RACH preamble. The UE may initially transmit a first preamble with a first power level. When the UE does not detect an echo based at least in part on the first preamble, the UE may subsequently transmit additional preambles with incrementally increasing power levels. In some aspects, the UE may subsequently transmit the additional preambles without being subjected to a random backoff. In other words, after transmitting a preamble and not detecting an echo based at least in part on the preamble, the UE may transmit an additional preamble without being subjected to a random backoff. As a result, the UE may transmit the additional preamble in a relatively short period of time, thereby reducing an amount of time taken to detect persons in a self-driving vehicle or a building.

In the example shown in FIG. 9, the UE may transmit a first preamble with a first power level. The UE may transmit a second preamble with a second power level. The UE may transmit a third preamble with a third power level. The UE may transmit a fourth preamble with a fourth power level. The fourth power level may be greater than the third power level, the third power level may be greater than the second power level, and the second power level may be greater than the first power level. A time duration between the first preamble and the second preamble, a time duration between the second preamble and the third preamble, and a time duration between the third preamble and the fourth preamble may be relatively short since the UE may not perform random backoff when no response (e.g., echo) is detected that is above a threshold (e.g., Min_R_Echo).

As indicated above, FIG. 9 is provided as an example. Other examples may differ from what is described with regard to FIG. 9.

In some aspects, random backoff in NR may minimize a likelihood of interference (or collisions) with other UEs, since RACH occasions may be contention-based. The likelihood of interference may further be minimized based at least in part on transmitting preambles at relatively low power levels, using an ARFCN frequency associated with relatively small RSRP levels and/or RSSI levels, and/or selecting a weakest beam direction in relation to other beam directions. However, other potential collision issues may be present when the UE transmits preambles to detect a presence of a person in a self-driving vehicle or in a building.

One potential collision issue may involve downlink/uplink collisions. A UE (e.g., a cellular modem or a sensor) is generally supposed to transmit during uplink slots, but the UE may transmit during downlink slots instead of the uplink slots. The UE transmitting during the downlink slots may cause interference to nearby UEs trying to receive downlink transmissions from a base station. In some aspects, the UE may follow a TDD downlink/uplink pattern of a serving cell (and neighboring cells if available) to avoid the downlink/uplink collisions.

Another potential collision issue may involve collisions between multiple UEs (e.g., multiple cellular modems or multiple sensors) acting independently within a same self-driving vehicle or within a same building. The collisions may be avoided by implementing coordination among the UEs. The collisions may also be avoided by using random backoff. The random backoff may involve using possibly different backoff parameters as compared to NR, which may reduce a likelihood of collisions between the multiple UEs.

Another potential collision issue may involve collisions with sidelink UEs. In some cases, the UE may be connected to a base station that does not support NR sidelink communications. In other words, the UE may be associated with a band or a cell that does not support the NR sidelink communications. In other cases, in which the UE is connected to a base station that does support NR sidelink communications, another sidelink UE may be associated with the self-driving vehicle (e.g., the other sidelink UE may be embedded in a seatback of the self-driving vehicle), and NR sidelink communications may be performed between two UEs to sense the presence of persons in the self-driving vehicle. The two UEs may be the UE connected to the base station that supports the NR sidelink communications and the other sidelink UE. The two UEs may communicate with each other via a sidelink interface when detecting whether one or more persons are present in the self-driving vehicle. The two UEs may use an NR sidelink framework that minimizes collisions with UEs outside of the self-driving vehicle.

Figure 10:
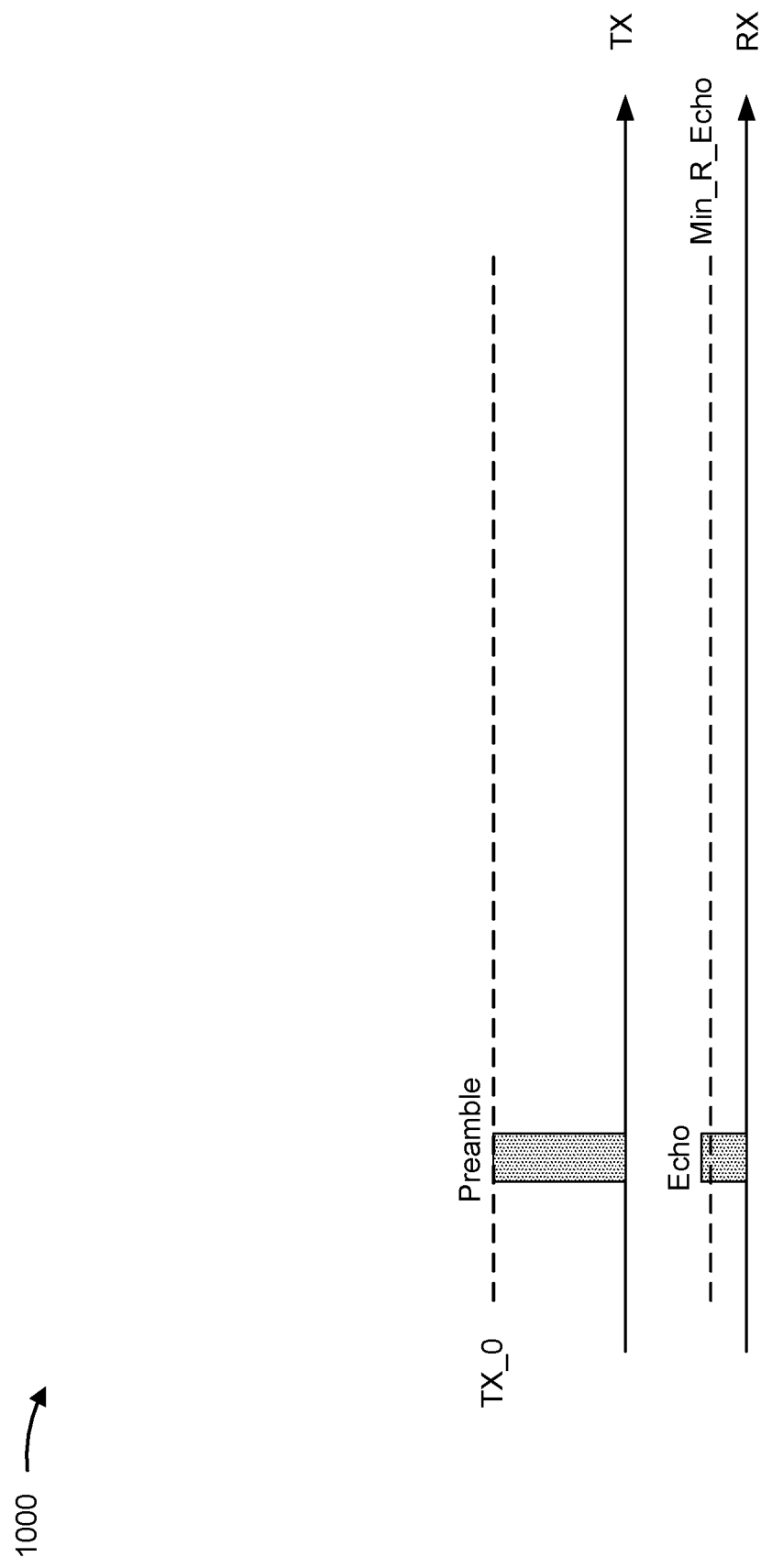

FIG. 10 is a diagram illustrating an example 1000 associated with transmitting a preamble, in accordance with the present disclosure.

In some aspects, a UE (e.g., UE 120), such as a cellular modem, may store information associated with a last successful signal level. The last successful signal level may be a transmit power associated with a preamble for which an echo was received. The UE may start transmitting a preamble at the transmit power associated with the last successful signal level, based at least in part on the information associated with the last successful signal level stored at the UE. The UE may start transmitting the preamble at the transmit power to reduce a delay in detecting an echo based at least in part on the preamble. In other words, since that transmit power was previously successful in the past for receiving an echo, the UE may start transmitting the preamble at that transmit power again to reduce a delay in detecting the echo, and thereby reducing an amount of time taken to detect a presence of one or more persons in a self-driving vehicle or in a building.

In some aspects, the UE may store information associated with last successful signal levels based at least in part on a location and/or a vehicle orientation. Different locations and/or different vehicle orientations may be associated with a different NR network environment. A transmit power of a preamble associated with a first location and/or vehicle orientation that is likely to produce an echo may be different than a transmit power of a preamble associated with a second location and/or vehicle orientation that is likely to produce an echo. The UE may store the information regarding an initial transmit power for a preamble with respect to a particular location and/or vehicle orientation.

In the example shown in FIG. 10, the UE may transmit a preamble with a transmit power (TX_0), and the UE may detect an echo that satisfies a threshold (e.g., Min_R_Echo) based at least in part on the preamble with the transmit power. The UE may select the transmit power for transmitting the preamble based at least in part on stored information associated with a last successful signal level to produce an echo that satisfies the threshold. In some cases, the last successful signal level, as indicated in the stored information, may be associated with a particular location and/or a particular vehicle orientation. In other words, when the UE in a self-driving vehicle travels to the particular location or is oriented in a manner that indicates that the particular vehicle orientation is met, the UE may select the transmit power for transmitting the preamble.

As indicated above, FIG. 10 is provided as an example. Other examples may differ from what is described with regard to FIG. 10.

Figure 11:
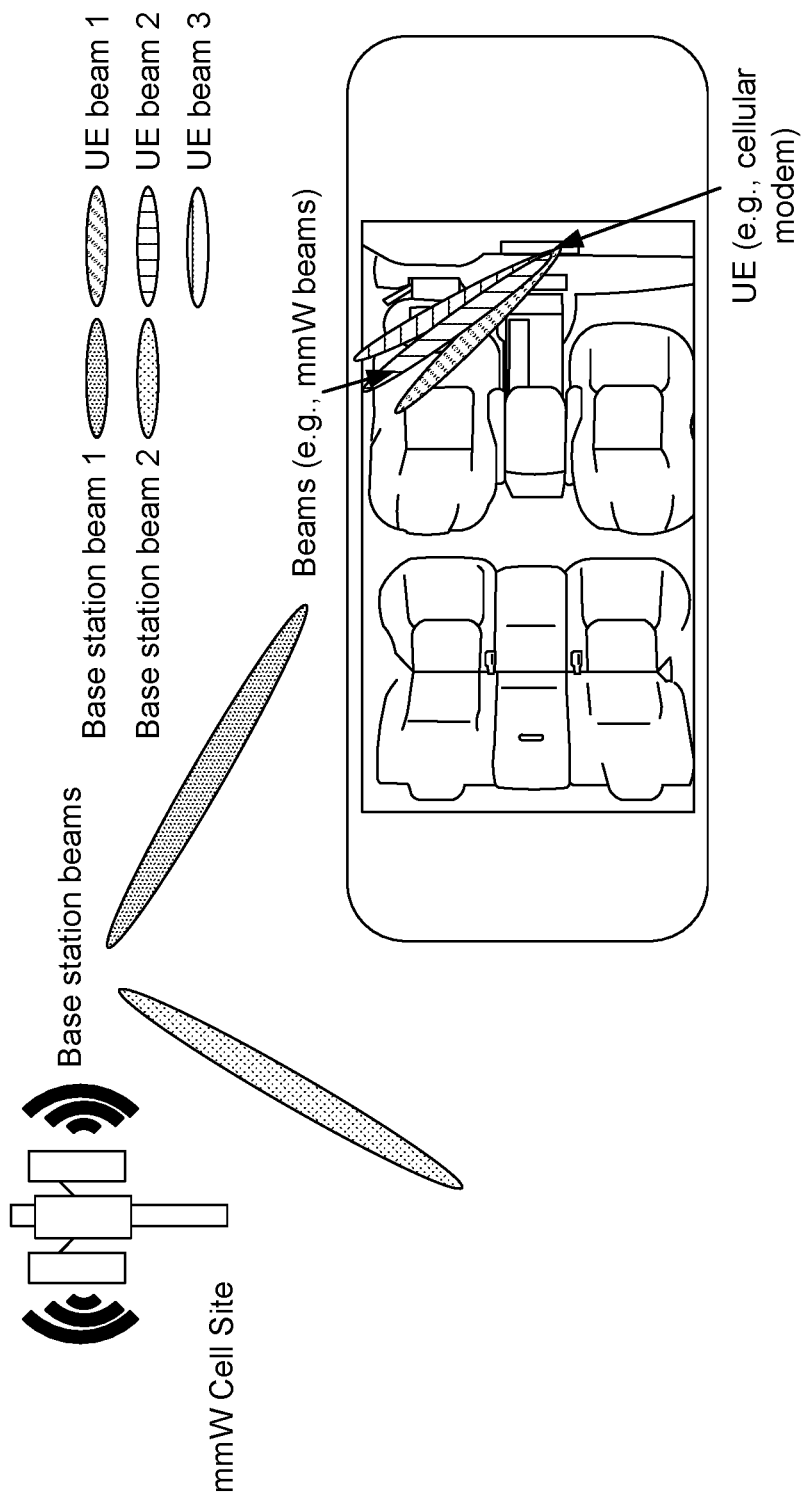
FIG. 11 is a diagram illustrating an example associated with selecting a beam direction, in accordance with the present disclosure.

FIG. 11 is a diagram illustrating an example 1100 associated with selecting a beam direction, in accordance with the present disclosure.

In some aspects, a UE (e.g., UE 120), such as a cellular modem, may select a beam direction from a plurality of beam directions based at least in part on an SSB measurement associated with the beam direction. The beam direction may be associated with a weakest network radiated beam direction, as compared to other beam directions in the plurality of beam directions. The UE may transmit a preamble using the weakest network radiated beam direction in order to minimize an amount of network interference. Beams associated with a first subset of the plurality of beam directions may be associated with a sensing of the echo and beams associated with a second subset of the plurality of beam directions may be associated with a transmission of the preamble.

As shown in FIG. 11, a UE may be associated with a first UE beam, a second UE beam, and a third UE beam. A base station may be associated with a first base station beam and a second base station beam. The UE may avoid transmitting a preamble using the first UE beam when the base station is attempting to receive the preamble using the first base station beam. However, the UE may still use the first UE beam for transmitting the preamble when the base station is receiving the preamble on the second base station beam, corresponding to an SSB beam that is received with a relatively weak signal strength by the UE using the first UE beam.

In some aspects, the UE may simultaneously perform sensing inside of a self-driving vehicle or building and perform a communication outside of the self-driving vehicle or building. In other words, the UE may simultaneously perform the sensing inside of the self-driving vehicle or building using the second UE beam or the third UE beam and perform the communication outside of the self-driving vehicle or building using the first UE beam. The UE may use the first UE beam to perform the communication with the base station outside of the self-driving vehicle or building.

As indicated above, FIG. 11 is provided as an example. Other examples may differ from what is described with regard to FIG. 11.

In some aspects, a UE (e.g., UE 120), such as a cellular modem, may detect a presence of a person in a self-driving vehicle or in a building based at least in part on transmitting a preamble and detecting an echo based at least in part on the preamble. The UE may generate an output that indicates that the person is present in the self-driving vehicle or in the building, or the output may indicate a likelihood that the person is present in the self-driving vehicle or in the building. Further, the UE may receive information from other sensor systems. The other sensor systems may include, for example, motion sensors that control lights in buildings or weight-based sensors that detect a presence of a person on a vehicle seat. The UE may combine the output with the information received from the other sensor systems to produce a final output, which may indicate whether the person is present in the self-driving vehicle or in the building. In some aspects, the UE may produce the final output using machine learning. In some aspects, combining the output based on the preamble and the echo along with the information from the other sensor systems may avoid false positives or missed detection events, which may occur with reliance on a single UE approach. For example, a weight-based sensor may be misled by a heavy non-passenger load, such as luggage placed on a vehicle seat. Further, the UE may provide input on a size and/or shape of vehicle seat occupant to reduce ambiguity between persons versus objects in the self-driving vehicle or in the building.

Figure 12:
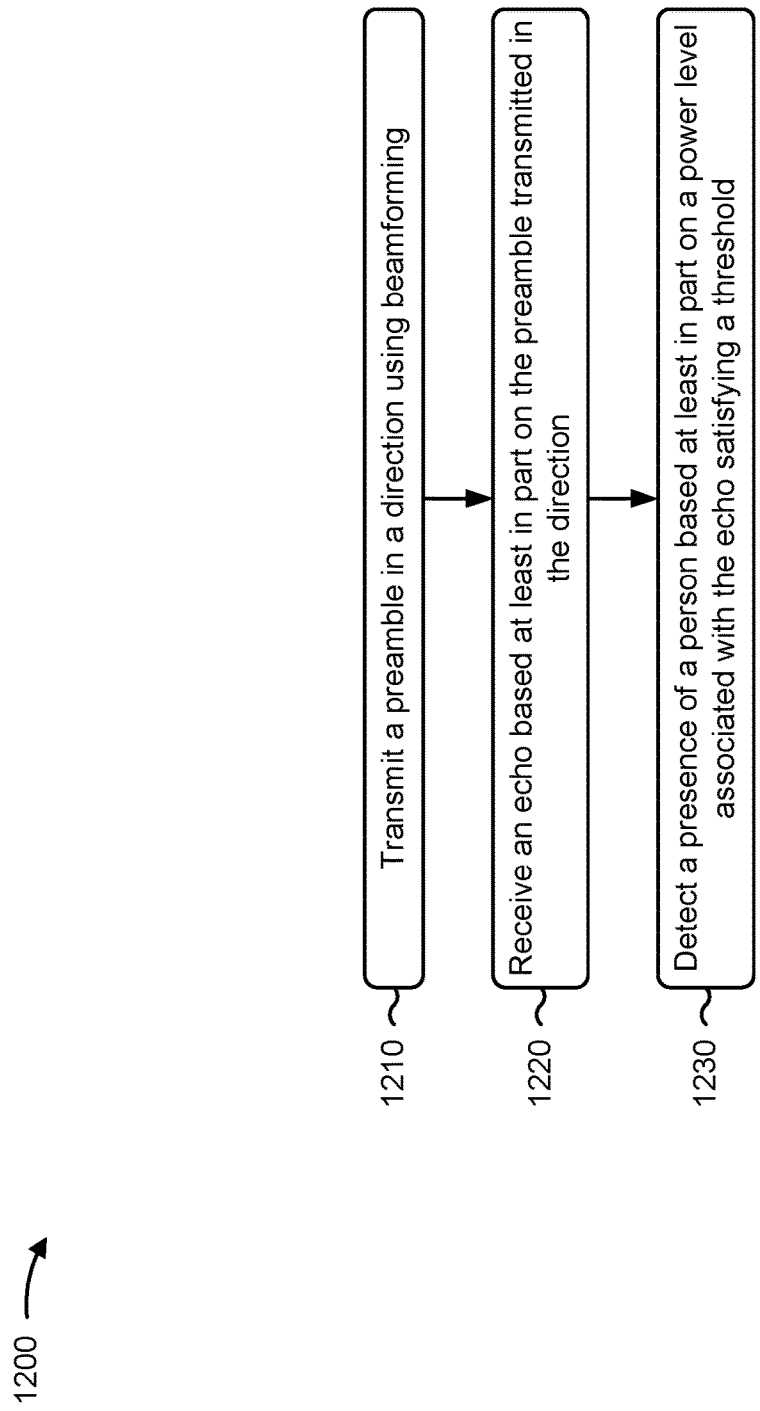
FIG. 12 is a diagram illustrating an example process associated with detecting a presence of a person using a preamble and an echo associated with the preamble, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with detecting a presence of a person using a preamble and an echo associated with the preamble.

As shown in FIG. 12, in some aspects, process 1200 may include transmitting a preamble in a direction using beamforming (block 1210). For example, the UE (e.g., using communication manager 140 and/or transmission component 1304, depicted in FIG. 13) may transmit a preamble in a direction using beamforming, as described above.

As further shown in FIG. 12, in some aspects, process 1200 may include receiving an echo based at least in part on the preamble transmitted in the direction (block 1220). For example, the UE (e.g., using communication manager 140 and/or reception component 1302, depicted in FIG. 13) may receive an echo based at least in part on the preamble transmitted in the direction, as described above.

As further shown in FIG. 12, in some aspects, process 1200 may include detecting a presence of a person based at least in part on a power level associated with the echo satisfying a threshold (block 1230). For example, the UE (e.g., using communication manager 140 and/or detection component 1308, depicted in FIG. 13) may detect a presence of a person based at least in part on a power level associated with the echo satisfying a threshold, as described above.

Process 1200 may include additional aspects, such as any single aspect or any combination of aspects described below and/or in connection with one or more other processes described elsewhere herein.

In a first aspect, a difference between the power level and a background power level satisfies the threshold, and the direction includes a driver seat direction or a passenger seat direction.

In a second aspect, alone or in combination with the first aspect, the preamble includes multiple preambles, and process 1200 includes detecting the presence of the person based at least in part on a subset of the multiple preambles being associated with echoes having power levels that satisfy the threshold.

In a third aspect, alone or in combination with one or more of the first and second aspects, process 1200 includes transmitting multiple preambles in multiple directions using multiple sweeping beams.

In a fourth aspect, alone or in combination with one or more of the first through third aspects, process 1200 includes providing a command based at least in part on detecting the presence of the person, wherein the command instructs an external system to perform one of adjusting a temperature, adjusting a lighting, or adjusting a sound level based at least in part on the presence of the person.

In a fifth aspect, alone or in combination with one or more of the first through fourth aspects, the preamble is a RACH preamble, wherein the preamble does not correspond with a preamble sequence configured for an NR cell that includes the UE, and process 1200 includes transmitting one or more preambles without a random backoff.

In a sixth aspect, alone or in combination with one or more of the first through fifth aspects, process 1200 includes transmitting one or more preambles associated with increasing power levels, and process 1200 includes stopping the one or more preambles from being transmitted based at least in part on the power level associated with the echo satisfying the threshold.

In a seventh aspect, alone or in combination with one or more of the first through sixth aspects, process 1200 includes transmitting the preamble using an ARFCN frequency with an RSRP or an RSSI that satisfies a threshold to reduce interference with existing NR cells.

In an eighth aspect, alone or in combination with one or more of the first through seventh aspects, process 1200 includes transmitting the preamble based at least in part on a TDD downlink-uplink pattern of one or more of a serving cell or a neighboring cell, transmitting the preamble based at least in part on coordination with other UEs, or transmitting the preamble over a sidelink interface.

In a ninth aspect, alone or in combination with one or more of the first through eighth aspects, process 1200 includes transmitting the preamble at a power level that corresponds to a last successful power level for receiving a last echo, wherein the power level for the preamble is associated with one or more of a location or a vehicle orientation.

In a tenth aspect, alone or in combination with one or more of the first through ninth aspects, process 1200 includes receiving, from a base station, one or more SSBs, and determining a weakest network radiated beam direction among a plurality of beam directions based at least in part on the one or more SSBs, wherein the weakest network radiated beam direction is associated with a power level that is less than other beam directions in the plurality of beam directions, and process 1200 includes transmitting the preamble using the weakest network radiated beam direction, wherein beams associated with a first subset of the plurality of beam directions are associated with a sensing of the echo and beams associated with a second subset of the plurality of beam directions are associated with a transmission of the preamble to perform a communication with a base station.

In an eleventh aspect, alone or in combination with one or more of the first through tenth aspects, detecting the presence of the person is based at least in part on the power level associated with the echo satisfying the threshold and using information received from one or more sensor systems.

In a twelfth aspect, alone or in combination with one or more of the first through eleventh aspects, the UE is a cellular modem associated with a self-driving vehicle, or the UE is a cellular modem associated with a building.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
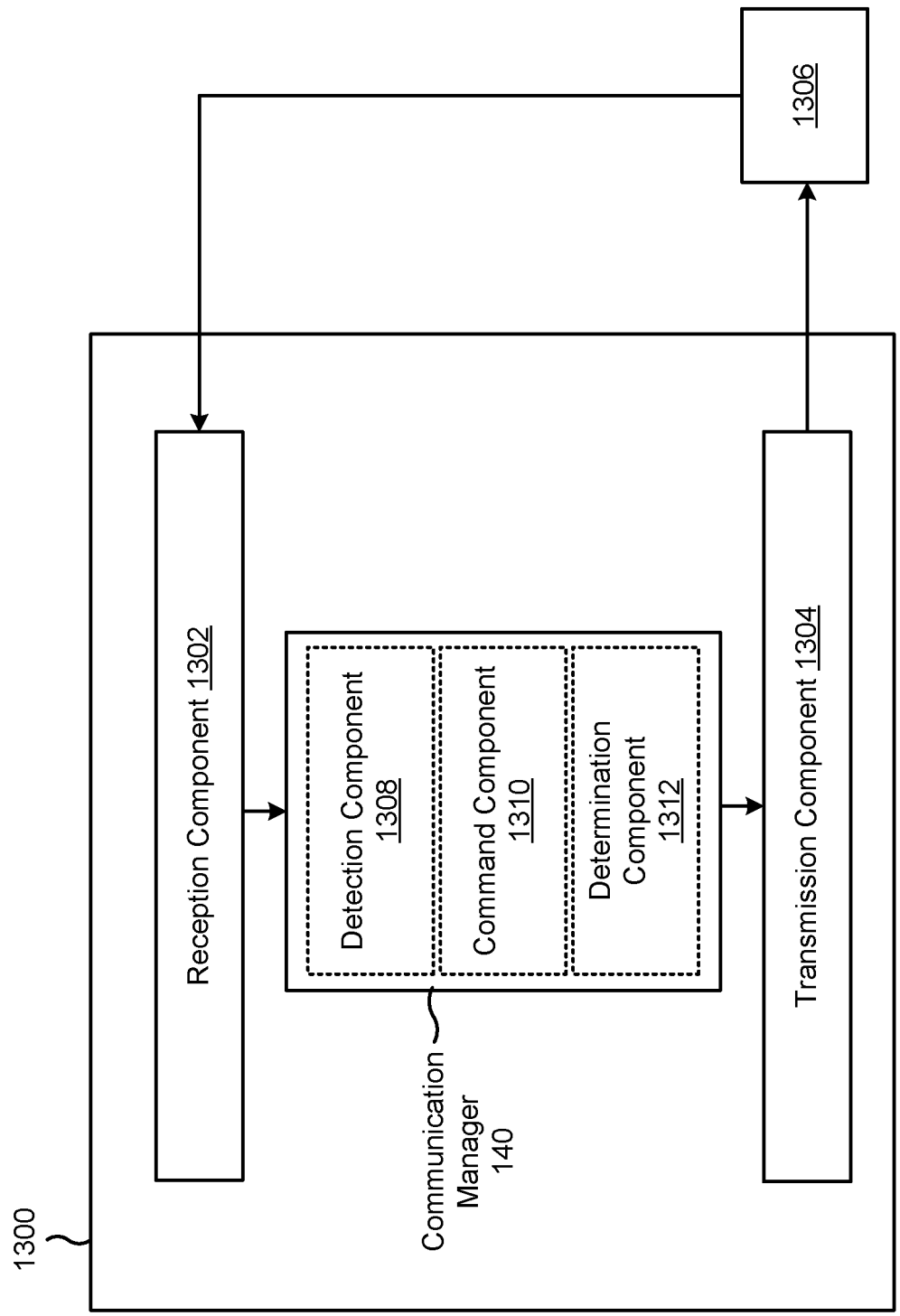
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a detection component 1308, a command component 1310, or a determination component 1312, among other examples.

In some aspects, the apparatus 1300 may be configured to perform one or more operations described herein in connection with FIGS. 3-11. Additionally, or alternatively, the apparatus 1300 may be configured to perform one or more processes described herein, such as process 1200 of FIG. 12. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The transmission component 1304 may transmit a preamble in a direction using beamforming. The reception component 1302 may receive an echo based at least in part on the preamble transmitted in the direction. The detection component 1308 may detect a presence of a person based at least in part on a power level associated with the echo satisfying a threshold.

The transmission component 1304 may transmit multiple preambles in multiple directions using multiple sweeping beams. The detection component 1308 may detect the presence of the person based at least in part on a subset of the multiple preambles being associated with echoes having power levels that satisfy the threshold. The command component 1310 may provide a command based at least in part on detecting the presence of the person, wherein the command instructs an external system to perform one of: adjusting a temperature, adjusting a lighting, or adjusting a sound level based at least in part on the presence of the person.

The transmission component 1304 may transmit one or more preambles without a random backoff. The transmission component 1304 may transmit one or more preambles associated with increasing power levels. The transmission component 1304 may transmit the preamble using an ARFCN frequency with an RSRP or an RSSI that satisfies a threshold to reduce interference with existing NR cells. The transmission component 1304 may transmit the preamble based at least in part on a TDD downlink-uplink pattern of one or more of a serving cell or a neighboring cell. The transmission component 1304 may transmit the preamble based at least in part on coordination with other UEs. The transmission component 1304 may transmit the preamble over a sidelink interface. The transmission component 1304 may transmit the preamble at a power level that corresponds to a last successful power level for receiving a last echo.

The reception component 1302 may receive, from a base station, one or more SSBs. The determination component 1312 may determine a weakest network radiated beam direction among a plurality of beam directions based at least in part on the one or more SSBs, wherein the weakest network radiated beam direction is associated with a power level that is less than other beam directions in the plurality of beam directions. The transmission component 1304 may transmit the preamble using the weakest network radiated beam direction.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting a preamble in a direction using beamforming; receiving an echo based at least in part on the preamble transmitted in the direction; and detecting a presence of a person based at least in part on a power level associated with the echo satisfying a threshold.

Aspect 2: The method of Aspect 1, wherein a difference between the power level and a background power level satisfies the threshold, and wherein the direction includes a driver seat direction or a passenger seat direction.

Aspect 3: The method of any of Aspects 1 through 2, wherein the preamble includes multiple preambles, and wherein detecting the presence of the person comprises detecting the presence of the person based at least in part on a subset of the multiple preambles being associated with echoes having power levels that satisfy the threshold.

Aspect 4: The method of any of Aspects 1 through 3, wherein transmitting the preamble comprises transmitting multiple preambles in multiple directions using multiple sweeping beams.

Aspect 5: The method of any of Aspects 1 through 4, further comprising: providing a command based at least in part on detecting the presence of the person, wherein the command instructs an external system to perform one of: adjusting a temperature, adjusting a lighting, or adjusting a sound level based at least in part on the presence of the person.

Aspect 6: The method of any of Aspects 1 through 5, wherein the preamble is a random access channel preamble, wherein the preamble does not correspond with a preamble sequence configured for a New Radio cell that includes the UE, and wherein transmitting the preamble comprises transmitting one or more preambles without a random backoff.

Aspect 7: The method of any of Aspects 1 through 6, wherein transmitting the preamble comprises transmitting one or more preambles associated with increasing power levels, and further comprising stopping the one or more preambles from being transmitted based at least in part on the power level associated with the echo satisfying the threshold.

Aspect 8: The method of any of Aspects 1 through 7, wherein transmitting the preamble comprises transmitting the preamble using an absolute radio-frequency channel number frequency with a reference signal received power or a received signal strength indicator that satisfies a threshold to reduce interference with existing NR cells.

Aspect 9: The method of any of Aspects 1 through 8, wherein transmitting the preamble comprises: transmitting the preamble based at least in part on a time division duplexing downlink-uplink pattern of one or more of a serving cell or a neighboring cell; transmitting the preamble based at least in part on coordination with other UEs; or transmitting the preamble over a sidelink interface.

Aspect 10: The method of any of Aspects 1 through 9, wherein transmitting the preamble comprises: transmitting the preamble at a power level that corresponds to a last successful power level for receiving a last echo, wherein the power level for the preamble is associated with one or more of a location or a vehicle orientation.

Aspect 11: The method of any of Aspects 1 through 10, further comprising: receiving, from a base station, one or more synchronization signal blocks (SSBs); and determining a weakest network radiated beam direction among a plurality of beam directions based at least in part on the one or more SSBs, wherein the weakest network radiated beam direction is associated with a power level that is less than other beam directions in the plurality of beam directions, and wherein transmitting the preamble comprises transmitting the preamble using the weakest network radiated beam direction, wherein beams associated with a first subset of the plurality of beam directions are associated with a sensing of the echo and beams associated with a second subset of the plurality of beam directions are associated with a transmission of the preamble to perform a communication with a base station.

Aspect 12: The method of any of Aspects 1 through 11, wherein detecting the presence of the person is based at least in part on the power level associated with the echo satisfying the threshold and using information received from one or more sensor systems.

Aspect 13: The method of any of Aspects 1 through 12, wherein: the UE is a cellular modem associated with a self-driving vehicle; or the UE is a cellular modem associated with a building.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
transmit a preamble in a direction using beamforming;
receive an echo based at least in part on the preamble transmitted in the direction; and
detect a presence of a person based at least in part on a power level associated with the echo satisfying a threshold.

2. The apparatus of claim 1, wherein a difference between the power level and a background power level satisfies the threshold, and wherein the direction includes a driver seat direction or a passenger seat direction.

3. The apparatus of claim 1, wherein the preamble includes multiple preambles, and wherein the one or more processors, to detect the presence of the person, are configured to detect the presence of the person based at least in part on a subset of the multiple preambles being associated with echoes having power levels that satisfy the threshold.

4. The apparatus of claim 1, wherein the one or more processors, to transmit the preamble, are configured to transmit multiple preambles in multiple directions using multiple sweeping beams.

5. The apparatus of claim 1, wherein the one or more processors are further configured to:
provide a command based at least in part on detecting the presence of the person, wherein the command instructs an external system to: adjust a temperature, adjust a lighting, or adjust a sound level based at least in part on the presence of the person.

6. The apparatus of claim 1, wherein the preamble is a random access channel preamble, wherein the preamble does not correspond with a preamble sequence configured for a New Radio cell that includes the UE, and wherein the one or more processors, to transmit the preamble, are configured to transmit one or more preambles without a random backoff.

7. The apparatus of claim 1, wherein the one or more processors, to transmit the preamble, are configured to transmit one or more preambles associated with increasing power levels, and wherein the one or more processors are further configured to stop the one or more preambles from being transmitted based at least in part on the power level associated with the echo satisfying the threshold.

8. The apparatus of claim 1, wherein the one or more processors, to transmit the preamble, are configured to transmit the preamble using an absolute radio-frequency channel number frequency with a reference signal received power or a received signal strength indicator that satisfies a threshold to reduce interference with existing New Radio cells.

9. The apparatus of claim 1, wherein the one or more processors, to transmit the preamble, are configured to:
transmit the preamble based at least in part on a time division duplexing downlink-uplink pattern of one or more of a serving cell or a neighboring cell;
transmit the preamble based at least in part on coordination with other UEs; or
transmit the preamble over a sidelink interface.

10. The apparatus of claim 1, wherein the one or more processors, to transmit the preamble, are configured to:
transmit the preamble at a power level that corresponds to a last successful power level for receiving a last echo, wherein the power level for the preamble is associated with one or more of a location or a vehicle orientation.

11. The apparatus of claim 1, wherein the one or more processors are further configured to:
receive, from a base station, one or more synchronization signal blocks (SSBs); and
determine a weakest network radiated beam direction among a plurality of beam directions based at least in part on the one or more SSBs, wherein the weakest network radiated beam direction is associated with a power level that is less than other beam directions in the plurality of beam directions, and
wherein the one or more processors, to transmit the preamble, are configured to transmit the preamble using the weakest network radiated beam direction, wherein beams associated with a first subset of the plurality of beam directions are associated with a sensing of the echo and beams associated with a second subset of the plurality of beam directions are associated with a transmission of the preamble to perform a communication with a base station.

12. The apparatus of claim 1, wherein the presence of the person is detected based at least in part on the power level associated with the echo satisfying the threshold and using information received from one or more sensor systems.

13. The apparatus of claim 1, wherein:
the UE is a cellular modem associated with a self-driving vehicle; or
the UE is a cellular modem associated with a building.

14. A method of wireless communication performed by a user equipment (UE), comprising:
transmitting a preamble in a direction using beamforming;
receiving an echo based at least in part on the preamble transmitted in the direction; and
detecting a presence of a person based at least in part on a power level associated with the echo satisfying a threshold.

15. The method of claim 14, wherein a difference between the power level and a background power level satisfies the threshold, and wherein the direction includes a driver seat direction or a passenger seat direction.

16. The method of claim 14, wherein the preamble includes multiple preambles, and wherein detecting the presence of the person comprises detecting the presence of the person based at least in part on a subset of the multiple preambles being associated with echoes having power levels that satisfy the threshold.

17. The method of claim 14, wherein transmitting the preamble comprises transmitting multiple preambles in multiple directions using multiple sweeping beams.

18. The method of claim 14, further comprising:
providing a command based at least in part on detecting the presence of the person, wherein the command instructs an external system to perform one of: adjusting a temperature, adjusting a lighting, or adjusting a sound level based at least in part on the presence of the person.

19. The method of claim 14, wherein the preamble is a random access channel preamble, wherein the preamble does not correspond with a preamble sequence configured for a New Radio cell that includes the UE, and wherein transmitting the preamble comprises transmitting one or more preambles without a random backoff.

20. The method of claim 14, wherein transmitting the preamble comprises transmitting one or more preambles associated with increasing power levels, and further comprising stopping the one or more preambles from being transmitted based at least in part on the power level associated with the echo satisfying the threshold.

21. The method of claim 14, wherein transmitting the preamble comprises transmitting the preamble using an absolute radio-frequency channel number frequency with a reference signal received power or a received signal strength indicator that satisfies a threshold to reduce interference with existing New Radio cells.

22. The method of claim 14, wherein transmitting the preamble comprises:
   transmitting the preamble based at least in part on a time division duplexing downlink-uplink pattern of one or more of a serving cell or a neighboring cell;
   transmitting the preamble based at least in part on coordination with other UEs; or
   transmitting the preamble over a sidelink interface.

23. The method of claim 14, wherein transmitting the preamble comprises:
   transmitting the preamble at a power level that corresponds to a last successful power level for receiving a last echo, wherein the power level for the preamble is associated with one or more of a location or a vehicle orientation.

24. The method of claim 14, further comprising:
   receiving, from a base station, one or more synchronization signal blocks (SSBs); and
   determining a weakest network radiated beam direction among a plurality of beam directions based at least in part on the one or more SSBs, wherein the weakest network radiated beam direction is associated with a power level that is less than other beam directions in the plurality of beam directions, and
   wherein transmitting the preamble comprises transmitting the preamble using the weakest network radiated beam direction, wherein beams associated with a first subset of the plurality of beam directions are associated with a sensing of the echo and beams associated with a second subset of the plurality of beam directions are associated with a transmission of the preamble to perform a communication with a base station.

25. The method of claim 14, wherein detecting the presence of the person is based at least in part on the power level associated with the echo satisfying the threshold and using information received from one or more sensor systems.

26. The method of claim 14, wherein:
   the UE is a cellular modem associated with a self-driving vehicle; or
   the UE is a cellular modem associated with a building.

27. A non-transitory computer-readable medium storing a set of instructions for wireless communication, the set of instructions comprising:
   one or more instructions that, when executed by one or more processors of a user equipment (UE), cause the UE to:
      transmit a preamble in a direction using beamforming;
      receive an echo based at least in part on the preamble transmitted in the direction; and
      detect a presence of a person based at least in part on a power level associated with the echo satisfying a threshold.

28. The non-transitory computer-readable medium of claim 27, wherein:
   the UE is a cellular modem associated with a self-driving vehicle; or
   the UE is a cellular modem associated with a building.

29. An apparatus for wireless communication, comprising:
   means for transmitting a preamble in a direction using beamforming;
   means for receiving an echo based at least in part on the preamble transmitted in the direction; and
   means for detecting a presence of a person based at least in part on a power level associated with the echo satisfying a threshold.

30. The apparatus of claim 29, wherein:
   the apparatus is a cellular modem associated with a self-driving vehicle; or
   the apparatus is a cellular modem associated with a building.

* * * * *